United States Patent [19]

Ezaki et al.

[11] Patent Number: 4,797,765
[45] Date of Patent: Jan. 10, 1989

[54] THIN FILM MAGNETIC HEAD HAVING SOLDER-BONDED PROTECTIVE PLATE

[75] Inventors: Joichiro Ezaki; Hiroshi Kanai, both of Saku, Japan

[73] Assignee: TDK Corporation, Tokyo, Japan

[21] Appl. No.: 183,542

[22] Filed: Apr. 14, 1988

Related U.S. Application Data

[63] Continuation of Ser. No. 847,358, Apr. 2, 1986, abandoned.

[30] Foreign Application Priority Data

Apr. 3, 1985 [JP] Japan .............................. 60-48668[U]

[51] Int. Cl.$^4$ .......................... G11B 5/255; G11B 5/31; G11B 5/105
[52] U.S. Cl. .................................... 360/110; 360/122; 360/126; 360/129
[58] Field of Search ........ 360/110, 122, 123, 125–129; 29/603

[56] References Cited

U.S. PATENT DOCUMENTS

| | | | |
|---|---|---|---|
| 3,846,841 | 11/1974 | Lazzari et al. | 360/122 X |
| 4,404,608 | 9/1983 | Yasuda et al. | 360/126 |
| 4,535,376 | 8/1985 | Nomura et al. | 360/126 |
| 4,546,541 | 10/1985 | Reid | 29/603 |

FOREIGN PATENT DOCUMENTS

| | | | |
|---|---|---|---|
| 59-58613 | 4/1984 | Japan | 29/603 |
| 59-90218 | 5/1984 | Japan | 29/603 |

OTHER PUBLICATIONS

Hattori et al., "Magnetic Recording Head with Fixed Coil", Review of the Electrical Communication Laboratories, vol. 23, Nos. 3 and 4, Mar.–Apr. 1979.

Primary Examiner—Stuart N. Hecker
Assistant Examiner—Benjamin E. Urcia
Attorney, Agent, or Firm—Seidel, Gonda, Lavorgna & Monaco

[57] ABSTRACT

A thin film magnetic head comprising a thin film magnetic head structure and a protective plate thereon such as glass or the like has an improved bonding interlayer between them. The interlayer is formed by fusing together registered solder areas which have been preformed respectively on the mirror image positions of the upper surface of the head structure and the lower surface of the protective plate.

5 Claims, 2 Drawing Sheets

U.S. Patent  Jan. 10, 1989  Sheet 1 of 2  4,797,765

THIN FILM MAGNETIC HEAD HAVING SOLDER-BONDED PROTECTIVE PLATE

This is a continuation of application Ser. No. 847,358, filed on 4-2-86, now abandoned.

FIELD OF THE INVENTION

The present invention relates to a thin film magnetic head, and more particularly to a construction of a cover plate of such magnetic head.

BACKGROUND OF THE INVENTION

Heretofore, thin film magnetic heads have been widely employed in various devices such as magnetic disk drives or the like. The thin film magnetic head is conventionally produced by using various techniques such as vacuum film forming, plating, photolithography, etching, etc. to form magnetic circuits, coils and other elements, and then forming a protective film thereon by sputtering a metal oxide thin film such as alumina and silica.

In the case where the thin film magnetic head is used in a large scale device such as a hard disk drive in a flying type or other non-contact magnetic head, it is usually housed in a sealed space and floated so that there is no need of using other protective measures than the above mentioned protective film if there is no contact of the head with other objects.

However, with the development of thin film magnetic head techniques, the thin film magnetic head finds various applications in home electric appliances. However, in such applications as a video tape recorder or a magnetic disk device in which a flexible magnetic recording medium is utilized, the magnetic head is not sealed any more and is exposed in the device unlike the hard disk drive, and is usually used in contact with a magnetic disk or tape. Accordingly, the conventional means for protecting the thin film magnetic head, avoiding its wear and mantaining an ideal contact between the head and the recording medium, was to use a further protective plate which is bonded to the surface of the thin film magnetic head to form a sandwich structure, having a generally spherical smooth surface.

In order to bond a thick protective plate on to the thin film magnetic head, the glass bonding process is often used in light of the durability and the bonding strength of glass. According to this method, a low melting point glass having a low softening temperature in the form of a thin rod or sheet is placed between the thin film magnetic head and the protective plate, the assembly is pressed together and heat-bonded. The fusing temperature during this operation is usually about 380° C. at the lowest and normally about 400° C. Therefore, it is essential that the thin film magnetic head can withstand this high temperature. However, known materials which are not impared in their properties under such high temperature condition are only those of sendust (for example, Fe85-A15-Si10) and permalloy (for example, Ni80-Fe20).

Superior in magnetic properties to these magnetic materials are amorphous alloys (for example, Co85-Nb10-Zr5) which, however, start partial crystallization when the protective plate is subjected to bonding operation due to the fact that the crystallization temperature is not very different from this heat treatment temperature, resulting in unwanted loss of the magnetic properties. Also, an organic material (for example, quinondiazide photosensitive resin (AZ-2350)), which is often used as an interlayer insulator for thin film magnetic heads, starts volume shrinkage at about 300° C. and thus cannot withstand the glass bonding operation.

An alternative method is also known in which an organic adhesive (for example, an epoxy resin known under the tradename "Araldite") is used to bond the protective plate. This method makes it possible to keep the curing temperature of this organic adhesive at less than 200° C., avoiding the high bonding temperature. The adhesive bonding has a drawback that, though milder than the glass bonding, is less reliable.

OBJECT OF THE INVENTION

A primary object of the present invention is to provide a thin film magnetic head having a protective plate bonded with a highly reliable bonded portion.

Another object of the present invention is to provide a thin film magnetic head having a protective plate which does not require reliance on a high temperature treatment.

BRIEF SUMMARY OF THE INVENTION

The present invention provides a thin film magnetic head covered with a protective plate bonded thereon, characterized in that at least one first solder area is formed on the surface of the magnetic head, at least one second solder area is formed on the back surface of the protective plate at the position corresponding to the first solder area, and the protective plate is superposed on and bonded to the magnetic head by fusion together of the first and second solder areas.

According to the present invention, bonding between a thin film magnetic head and a protective plate can be effected at a temperature below 300° C. which is lower than the crystallization temperature of amorphous alloy and thus amorphous thin film may be used as magnetic material.

In the following, the present invention will be fully described in conjunction with the accompanying drawings.

EMBODIMENT

Figure 1:
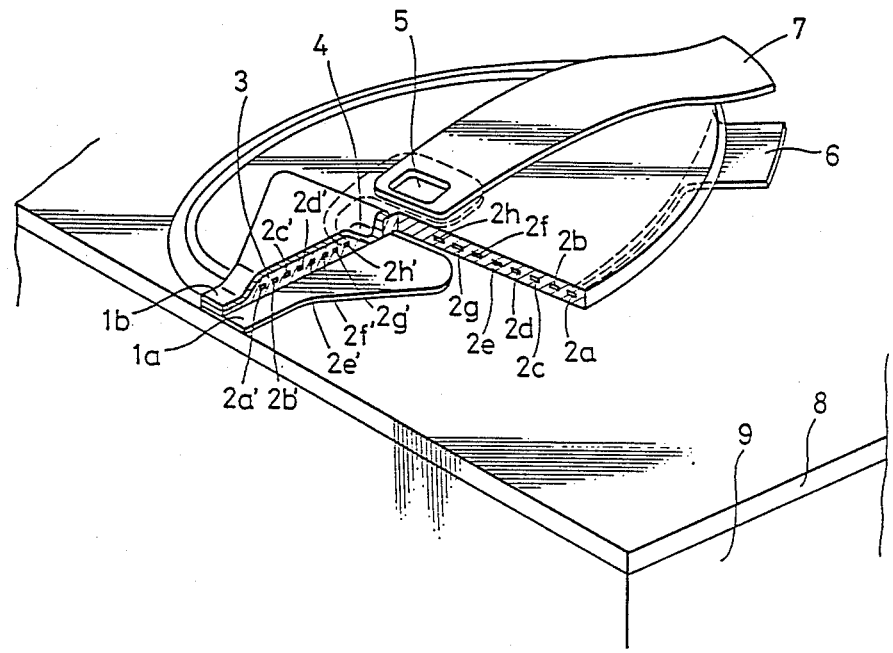
FIG. 1 is a partly broken perspective view of a thin film magnetic head.
Figure 2:
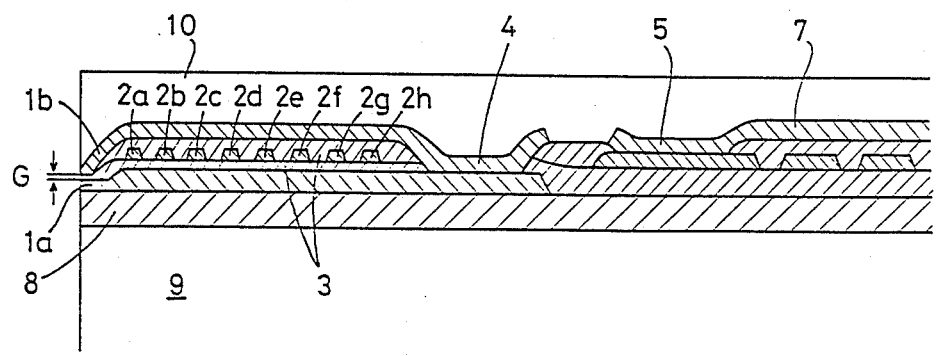
FIG. 2 is a cross sectional view of the magnetic head shown in FIG. 1.

The magnetic head comprises a lower magnetic film layer (lower core) 1a, an upper magnetic film layer (upper core) 1b, insulators 3 and 3 such as $Al_2O_3$ or other ceramics for separating these magnetic film layers from each other, a coil 2 consisting of spirally formed conductors 2a—2a' to 2h—2h' formed by plating of copper or other metals or alloys between the insulators 3 and 3, a substrate 9 having a surface insulating layer 8 such as $Al_2O_3$ thereon for supporting these elements. The upper and lower magnetic film layers 1a and 1b are magnetically connected at the area 4 which is encircled by the spiral coil 2. Both ends of the coil 2 are connected to leads 6 and 7, respectively. With this construction, electric current fed from the lead 6 passes through the spiral coil 2 to the area 5 and out to the lead 7. Although not shown in FIG. 1, the entire surface of the above assembly is covered with a protective film 10 such as $Al_2O_3$ as shown in FIG. 2. As will clearly be understood by FIG. 2 the front tips of the core or film layers 1a, 1b are abutted with an interposing gap G, from which a signal magnetic field is leaked and imposed on a magnetic recording medium or by which a magnetic signal in detected from a recording medium in the read-out mode.

Figure 3:
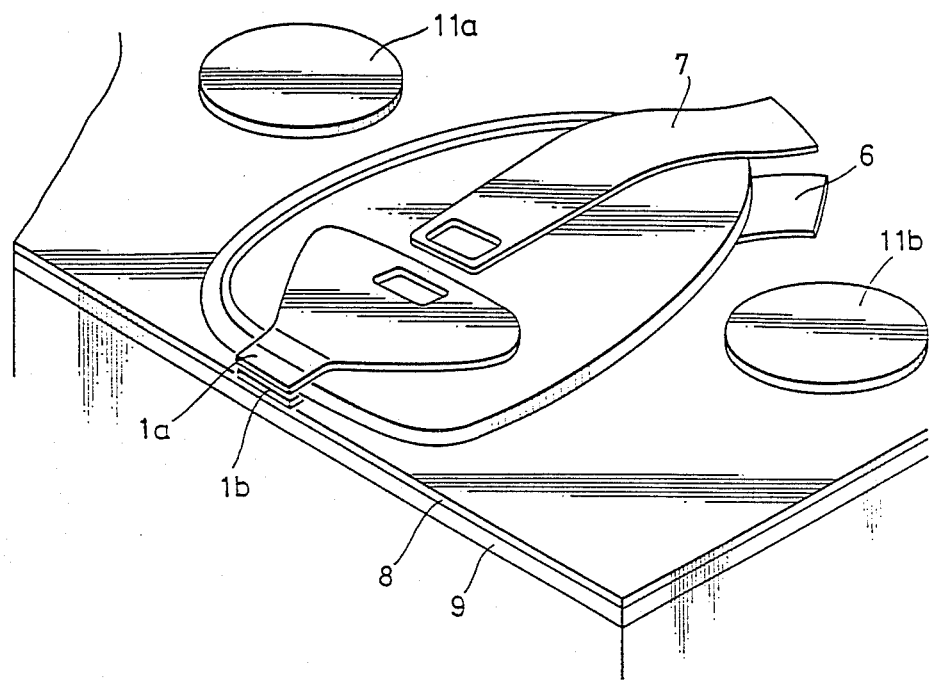
FIG. 3 is a perspective view of a thin film magnetic head having the bonded areas according to the present invention and FIG. 4 is a cross section illustrating the bonded areas between the protective plate and the thin film magnetic head.
Figure 4:
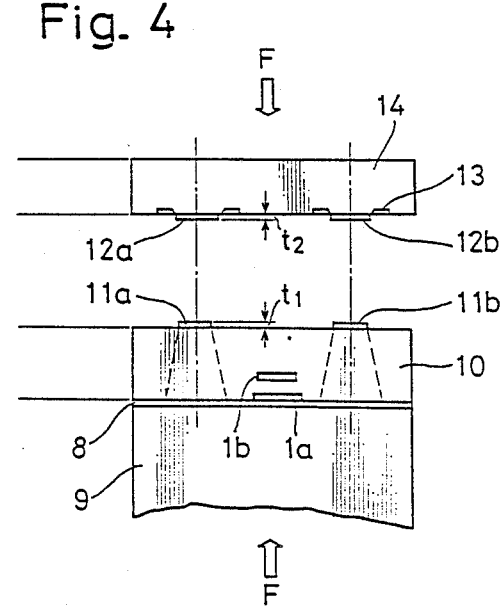

Referring to FIGS. 3 and 4 which illustrate an embodiment of the present invention, a protective plate and bonding means therefor will be described in detail. FIG. 3 is a perspective view of a thin film magnetic head similar to FIG. 1. Prior to the formation of a protective film, thick solder layers 11(a) and 11(b) are formed, for example, by a plating method. These areas are so formed that they will project from the protective film a distance equal to thickness t, and are formed by patterning during the process of manufacturing the thin magnetic head. These areas may be formed simultaneously with the formation of the banks for the leads 6 and 7 shown in FIG. 3. Thereafter, other required patterns are formed and then the protective film 10 is formed except for solder areas 11a and 11b (FIG. 4).

On the other hand, a protective plate 14 of glass or the like is separately prepared and subjected to photolithographic etching. Thereafter, solder areas 12a and 12b are formed by plating on the bottom surface of the protective plate 14 which faces the magnetic head, in the mirror image positions with respect to the solder areas 11a and 11b of the magnetic head, projecting by the height $t_2$ from the bottom surface of the protective plate 14. Preferably, annular or similar grooves 13 may be preformed around the solder areas 12a and 12b by patterning so as to prevent the solder from flowing to undesired areas. Alternatively, grooves may be formed around the solder areas 11a and 11b of the magnetic head in place of the grooves 13.

In assemblage, the protective plate 14 in superposed on the magnetic head in such manner that their solder areas are vertically registered and an infrared ray is applied to them while applying a force F between them. Thus, the solder areas 11a and 11b, and 12a and 12b are mutually fused together to form bonds. Excess solder, if any, is trapped in the grooves 13, whereby undesired adhesion by flow of solder to other areas can be prevented.

According to the invention, it is sufficient for bonding to heat by infrared ray irradiation for example to a temperature of about 200° C. or less which is the fusing temperature of solder. Accordingly, the bonding treatment can be effected substantially below about 300° C. which is the crystallization temperature of amorphous alloys which are often used as thin film magnetic materials for magnetic heads and strong bonds can be obtained.

What is claimed is:

1. A thin film magnetic head comprising:
    a head structure having a substrate, a head core formed of a thin magnetic material on said substrate, and a conductor encircling said head core to form a coil,
    a protective plate,
    at least two isolated first solder areas formed directly on the surface of said substrate,
    at least two isolated second solder areas formed on the surface of said protective plate,
    the protective plate facing the substrate such that the second solder areas are at a plane-symmetrical or mirror image position with respect to the first solder areas,
    the first and second solder areas being vertically registered and fused together,
    whereby a bond is formed between the head structure and said protective plate at said isolated solder areas,
    the surface of said head structure which faces the protective plate, except for said first solder areas, being covered by a protective coating, said first solder areas being partially encased in said protective coating.
2. A thin film magnetic head according to claim 1, wherein said thin film magnetic material is selected from amorphous alloys.
3. A thin film magnetic head according to claim 1, wherein at least one of the first and the second solder areas is surrounded by an annular groove in the respective surface on which said at least one of the first or second solder areas is formed.
4. A thin film magnetic head, comprising:
    a head structure having a substrate and a head core mounted thereon formed of a thin film magnetic material, a conductive coil encircling said head core, a protective coating encasing said head core, and solder material partially embedded in said protective coating and projecting from a discrete, limited portion of a surface of the protective coating,
    a protective plate having solder material projecting from a discrete, limited portion of a surface thereof,
    said solder material at said protective plate and protective coating being in alignment and fused together so as to bond the head structure and protective plate at said discrete, limited portions of said surfaces of said protective plate and protective coating.
5. A thin film magnetic head, comprising:
    a head structure having a substrate and a head core mounted thereon formed of a thin film magnetic material, a conductive coil encircling said head core, a protective coating encasing said head core, and solder material partially embedded in said protective coating and projecting from a limited portion of the surface of the protective coating at at least two discrete, spaced zones thereof,
    a protective plate having solder material projecting from a limited portion of the surface of the protective plate at at least two discrete, spaced zones thereof,
    said zones of solder material at said protective plate and protective coating being in alignment and fused together so as to bond the head structure and protective plate at said discrete, spaced zones on said surfaces of said protective plate and protective coating.

* * * * *